United States Patent [19]

Wollander

[11] Patent Number: 4,740,105
[45] Date of Patent: Apr. 26, 1988

[54] FISH DIVERSION SYSTEM

[75] Inventor: Jon R. Wollander, Eugene, Oreg.

[73] Assignee: Eugene Water & Electric Board, Eugene, Oreg.

[21] Appl. No.: 48,115

[22] Filed: May 11, 1987

[51] Int. Cl.$^4$ ............................................. E02B 8/08
[52] U.S. Cl. ......................................... 405/83; 405/81
[58] Field of Search ................... 405/80, 81, 82, 83, 405/15, 16, 21, 30, 28, 107

[56] References Cited

U.S. PATENT DOCUMENTS

| 366,257 | 7/1887 | Rogers | 405/81 |
|---|---|---|---|
| 2,169,249 | 8/1939 | Holmes et al. | 405/83 |
| 2,174,657 | 10/1939 | Helsel | 405/83 |
| 4,437,431 | 3/1984 | Koch | 405/81 |

FOREIGN PATENT DOCUMENTS 1055816  11/1983  U.S.S.R. ................................ 405/82

Primary Examiner—Dennis L. Taylor
Attorney, Agent, or Firm—Henderson & Sturm

[57] ABSTRACT

A diversion system for use in a watercourse for routing fish away from the intake, for example, of a hydroelectric plant. The system includes a plurality of upright screens arranged in zigzag fashion crosswise of the watercourse to provide a plurality of channels converging to outlets separate from the plant intake. The screens thus divert the fish and water-borne debris to the separate outlets while the main stream flows through the screens to the intake. Additionally, rotary sprayers are used to backwash the screens while in place from time to time to remove accumulated debris from the screens. The screens extend from the bottom of the watercourse to the water level while spanning the watercourse from one side wall to the other.

7 Claims, 4 Drawing Sheets

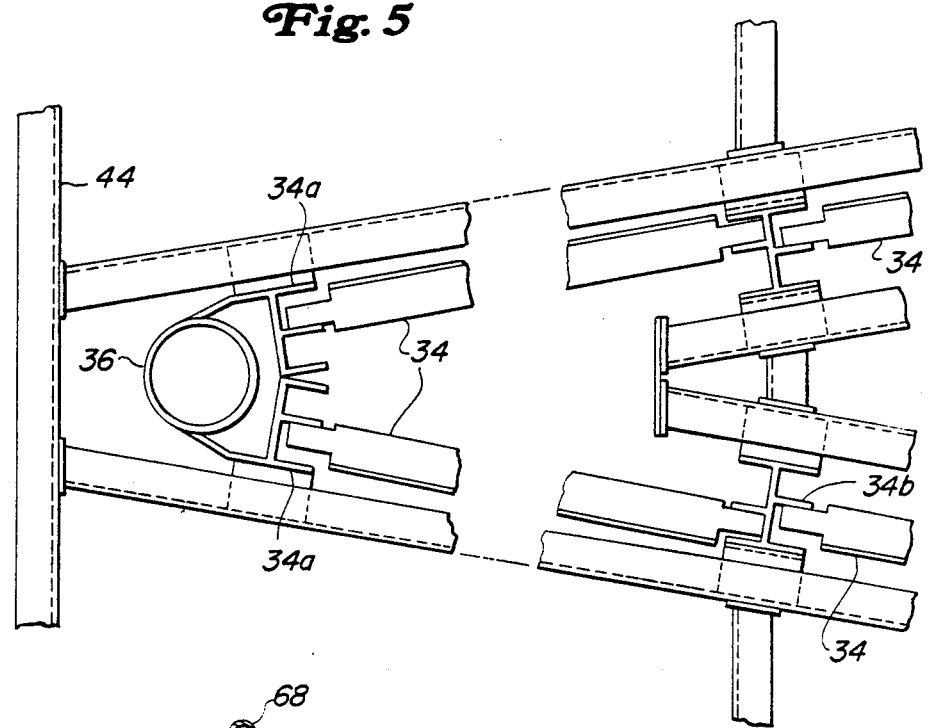
Fig. 5
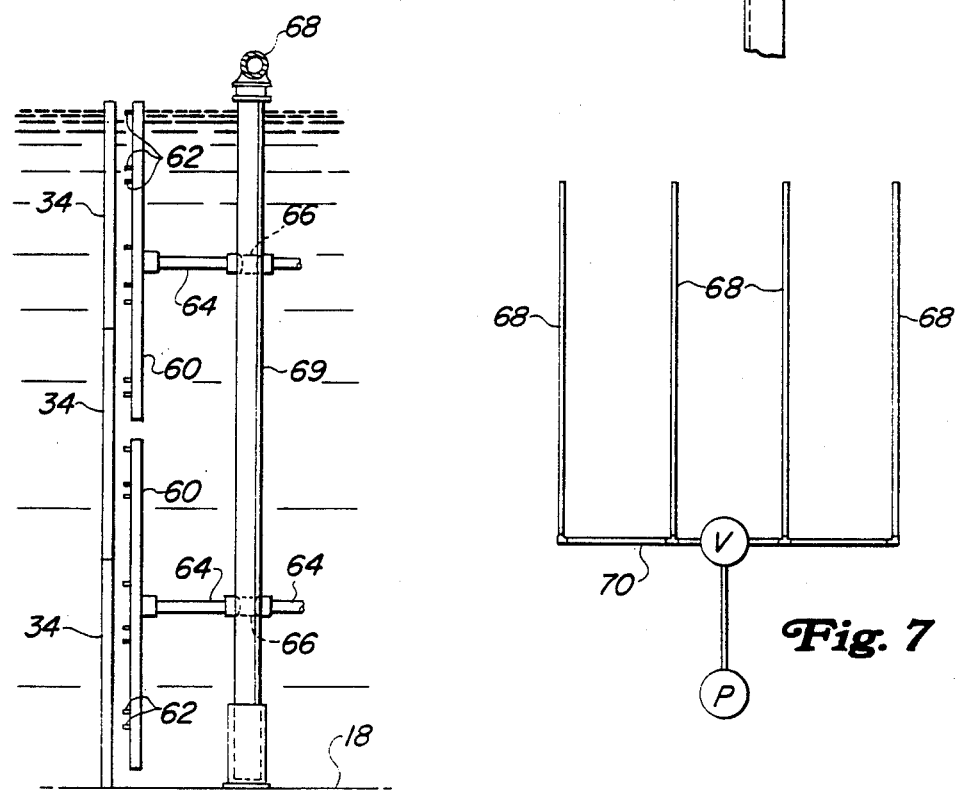
Fig. 6
Fig. 7

FISH DIVERSION SYSTEM

BACKGROUND AND SUMMARY OF THE INVENTION

As is well known, a typical system for furnishing water to a hydroelectric plant or any other facility requiring processed water may involve an auxiliary watercourse such as a canal alongside a main or natural stream such as a river. Water from the main stream is diverted to the canal which has an outlet leading to the generating or like plant. The recognized problem is that fish and debris from the main stream also enter the canal and, unless filtered out or otherwise directed away from the plant intake, enter that intake with attendant disadvantages.

Many efforts have been made to solve the problems, such as providing louvers across the stream, but the fish and debris pass through the louvers. If the louvers are more closely spaced apart, the fish impinge thereon and are injured or killed, besides which the pressure drop across the louvers becomes intolerable. Other systems use reciprocating or other types of movable screens, which are costly and inefficient and incur relatively high rates of fish mortality.

According to the present invention, an improved system is employed in an elongated watercourse having bottom and opposite side walls defining a channel or canal having an inlet for taking water from a main stream and having an outlet for leading water to the intake of a generating or like plant. The improved system effectively screens out fish and debris from the plant intake with little if any harm to the fish, which are directed to one or more exits separate from the canal outlet and plant intake and led back to the main stream. The arrangement includes a plurality of pairs of upright screens rising from the watercourse or canal bottom to at least the water level in the watercourse. The screens in each pair are arranged in convergent fashion to form a tapering channel having its large end upstream in the canal and its smaller end downstream. The smaller end leads to an exit apart from the canal outlet. The pairs of screens are interconnected at their free upstream ends so that when viewed from above, the whole results in a zigzag screen pattern spanning the canal from one side wall to the other. The angle between adjacent screens of each pair is relatively small so as to increase total screen area and to direct the fish toward the associated exit with little if any impingement of the fish on the screens. The major volume of water of course passes through the screens and flows via the canal outlet to the plant intake.

A further feature of the invention is a system for cleaning the screens periodically to dislodge accumulated debris. The cleaning means employs water-pressure-operated rotary spray means arranged to direct clean water against the inner or water-facing sides of the screens in backwash fashion, and the dislodged debris flows out the exits to the main stream.

Further features and objects of the invention will become apparent from the ensuring description of a preferred embodiment of the invention, taken with the accompanying drawings.

DESCRIPTION OF THE DRAWINGS

FIG. 5 is an enlarged fragmentary plan showing a typical screen arrangement.

FIG. 6 is an end view, with portions omitted, showing part of the rotary backwash means.

FIG. 7 is a schematic view showing a representative water supply system for the backwash means.

DETAILED DESCRIPTION OF A PREFERRED EMBODIMENT OF THE INVENTION

Figure 1:
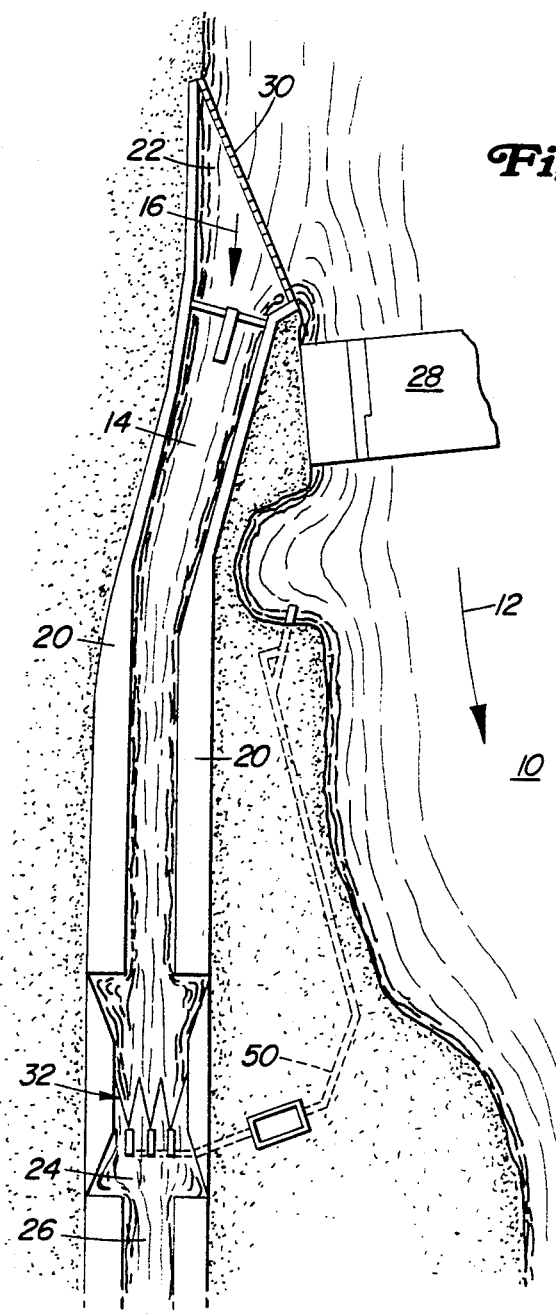
FIG. 1 is a plan schematic of a typical river and related canal arrangement embodying the invention.
Figure 3:
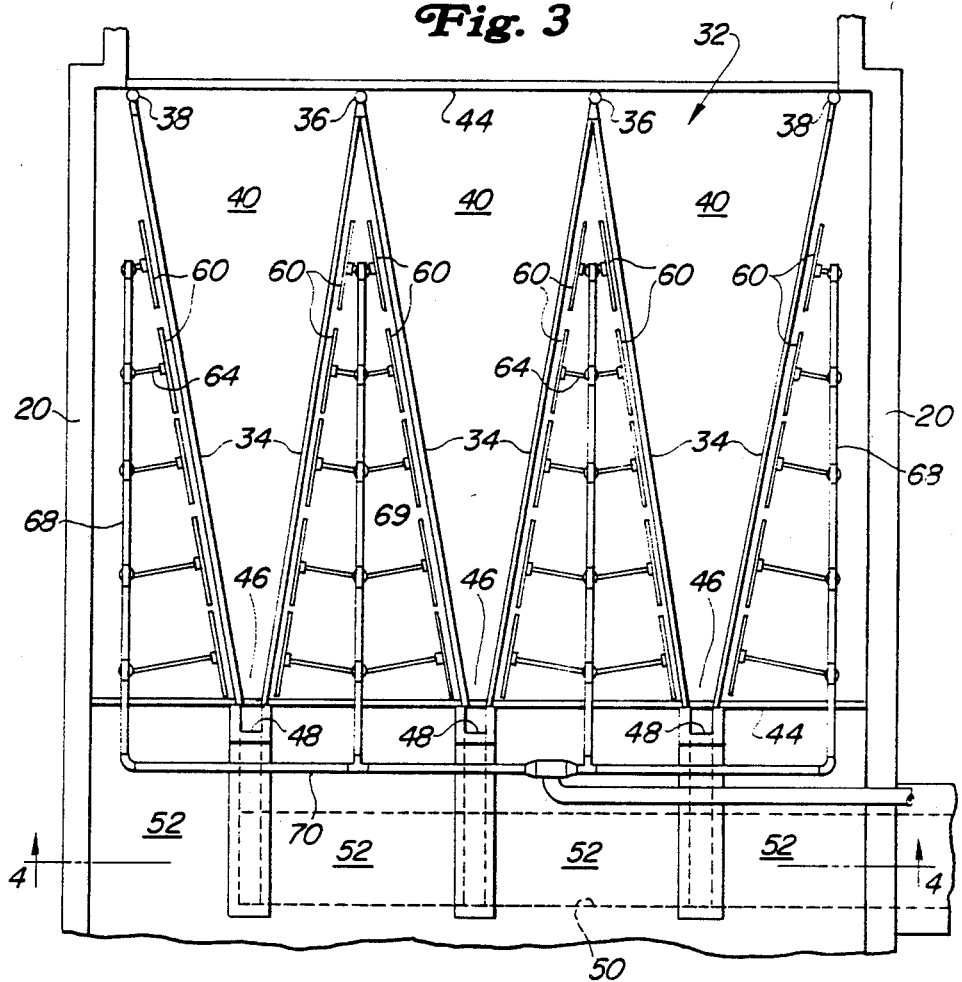
FIG. 3 is an enlarged plan of an intermediate part of the canal, showing the screen arrangement.
Figure 4:
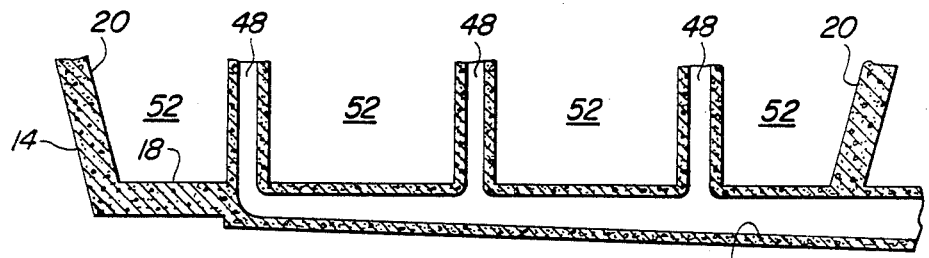
FIG. 4 is a fragmentary section along the line 4—4 of FIG. 3.

FIG. 1 is referred to first for an overview of the invention. In this view, the numeral (10) represents a portion of a main or natural stream such as a river, the direction of water flow or current being indicated by the arrow (12). An auxiliary watercourse (14), which may be a man-made canal or channel, draws water from the river. The flow of water in this canal is indicated by the arrow (16). In the present case, and by way of example only, the canal is preferably of concrete and has a bottom (18) and opposite side walls (20). The canal has an inlet (22) connected to the river and an outlet (24) connected to the intake (26) of a hydroelectric plant, for example. The canal inlet is shown as being located upstream of a dam (28), and a typical trash rack (30) is provided to intercept logs and like floating objects.

The basic diversion system, indicated generally by the numeral (32), is disposed across the canal intermediate its inlet and outlet ends and comprises a plurality of pairs of upright screens (34) with the screens in each pair arranged in downstream convergent fashion and with the upstream ends interconnected at (36) to provide a zigzag pattern from wall to wall of the canal. The outermost screens meet the canal walls respectively at (38). The screens thus produce a plurality of downstream convergent channels (40). As stated, the screens are disposed in an upright manner (FIG. 6) and preferably comprise a plurality of like screens stacked to a sufficient height to extend at least to the canal high water level. In one preferred construction, the total overall height of the screens is in the order of fifteen feet in width and fifteen feet in length, placed end to end in a group of three, giving an overall length in the order of forty-five feet. The upstream spacing between screens of a pair is in the order of sixteen feet, giving the screen system a configuration extending substantially lengthwise of the canal and thus avoiding or minimizing the impingement of fish on the screens and also reducing the flow velocity of the water through the screens. As seen, the length of the screens is in the order of 2.5 to 3.5 times the spacing of the screens of a pair at their widest ends and the included angle at their convergent ends is in the order of fifteen to twenty-five degrees. Screen panel height should be high enough to screen the anticipated high water mark. Each screen panel (34) is approximately fifteen feet wide by fifteen feet high in the prototype. The screens are supported between vertical channel columns (34a). Using a gantry crane, the screen panels can be vertically slide up and out, or down into the canal during canal full flow. This permits easy removal of the screens from the canal flow for storage, inspection, replacement, repair, etc.

A smooth overlapping "shingle" effect of the screen panel (34) and panel supports (34a) with respect to the water flow direction as shown on this plan view is accomplished by offsetting or doubling the channels as at (34b) by means of transverse supporting structure 44. This allows suspended debris and fish to continue downstream without hanging up on projecting corners of the structure.

As shown on this plan view, the screen panels (34) are constructed symmetrically about a center line between them to allow either side to be placed upstream.

Figure 2:
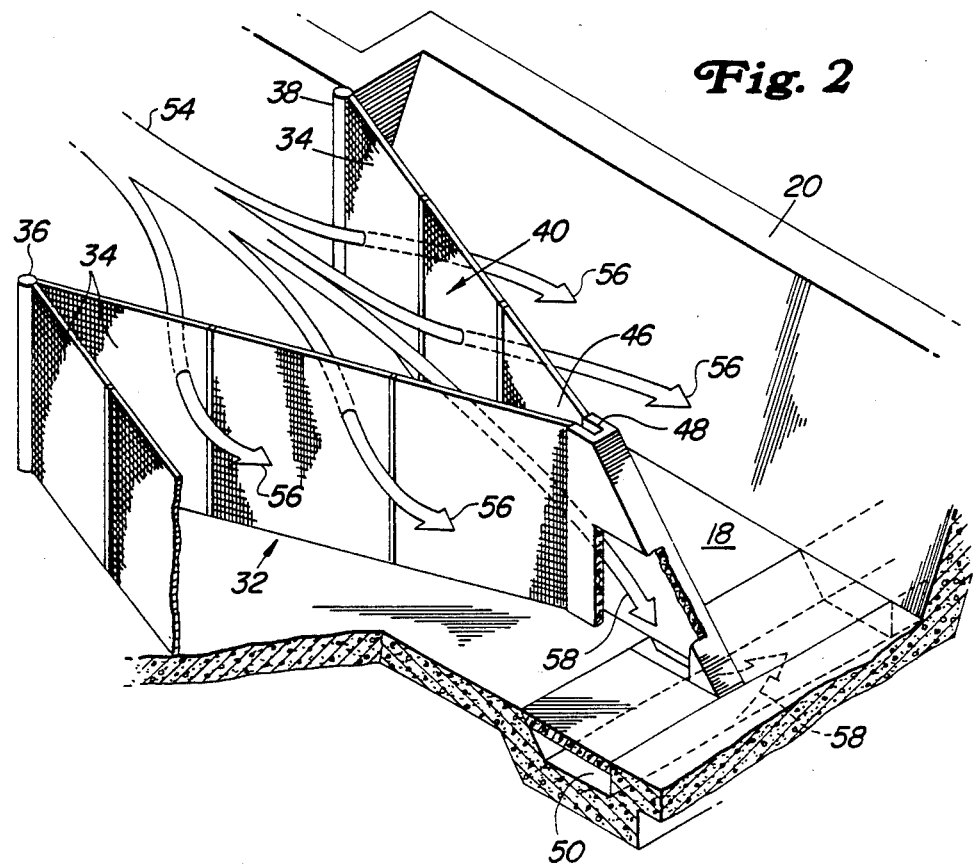
FIG. 2 is a schematic perspective illustrating the basic principles of the invention.
Figure 8:
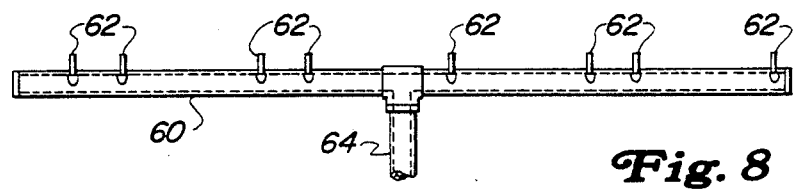
FIG. 8 is a partial view, showing part of a spray arm and its associated nozzles.

The screen panels in each pair are spaced closely apart at their area of convergence, as at (46) and these spaces provide a plurality of exits that lead via passages (48) to a common bypass means (50). This structure, here of concrete, separates the passages (48) and bypass (50) from the main channel exits (52). The bypass leads back to the river or main stream and the channels (52) lead, of course, to the main outlet and plant intake. It will be apparent from the description thus far that fish and debris (other than debris hung up on the screens) will pass through the bypass and thus back to the main stream, while water filtered through the screens will proceed to the plant for turbine consumption, etc. FIG. 2 best illustrates the process schematically, the unfiltered canal flow being shown by the arrow (54), the filtered water arrows are denoted at (56) and the fish and debris arrows are numbered (58). In this fashion, fish and debris are routed around the hydroelectric plant.

A further feature of the invention is the cleaning system for backwashing the screens in order to remove debris that may have accumulated during use of the system. For purposes of present illustration, the cleaning means is located at the downstream sides of the screens and includes a plurality of rotary spray arms or rotors (60), each of which is equipped with a plurality of spray nozzles (62), preferably spaced apart so as not to duplicate each other at opposite sides of the center of rotation and thus providing a spray pattern calculated to cover a maximum circular area on the screen portion being backwashed. In the present case, there are two sets (upper and lower) of five seven-foot diameter spray rotors for each screen panel and each rotor is rotatable on a tubular pipe axle (64) and these are in turn joined to a main supply tube system (68) by suitable rotary connectors (66). The upper and lower pipes are connected or supported by suitable pipes or other standards (69) (FIG. 6), and the piping system includes a header (70) connected to a pump P by an appropriate fitting including a valve V (FIG. 7). The nozzles on the spray bars are spaced along the bars in such fashion as to equalize the side forces of the spray and to provide full coverage. An extra nozzle at each end of each bar provides rotational force to the bar. The water supply for the backwash system is drawn from the canal downstream of the screen panels and may be further filtered by means not significant here. Pump pressure is sufficient to rotate the spray arms. Also, of importance in a commercial embodiment, the system may be controlled automatically and electronically by one or more of any number of available micro-processors and the like, the choice of which is left to the individual design and is of no patentable moment per se.

Fundamentally, the system uses vertically, converging screen panels to bypass fish from a canal flow and to route them unharmed around any biologically harmful activity, such as that exhibited by a hydroelectric plant and the like. Sufficient screening area is provided to minimize the velocity of the approaching water passing through the screens in order to avoid the impingement of fish on the screens. The zigzag configuration of the screening allows for compressing the necessary screening area into a relatively narrow canal.

Features and advantages not expressly described herein will become apparent to those versed in the art, as will many modifications in the preferred embodiment disclosed, all without departure from the spirit and scope of the invention.

I claim:

1. A fish diversion system including an elongated watercourse extending from a water inlet to a water outlet and having a bottom and opposite side walls, characterized in that a screen arrangement rises from the bottom to a height substantially at the water level in the watercourse and extends from one side wall to the other, the arrangement including at least a pair of upright screens converging away from the inlet and toward the outlet and spaced relatively closely apart crosswise of the watercourse at the area of convergence to provide an exit for fish, incidental water and debris, the screens being operative to screen out fish and debris and to direct same to the exit while enabling screened water to flow through the screens to the outlet, and bypass means is provided for separating the exit from the outlet and directing the exiting fish, debris and incidental water away from the outlet.

2. The fish diversion system of claim 1, further characterized in that there are several pairs of screens similar to the aforesaid pair and the pairs are connected at their ends facing the outlet to form a zigzag structure across the watercourse, and there are a plurality of like exits connected to the bypass means.

3. The fish diversion system of claim 2, in which the exits are connected together.

4. The fish diversion system of claims 1 or 2, further characterized in that water-pressured means is provided at the downstream sides of the screens for back-flushing the screens while in place to remove accumulated debris from the screens.

5. The fish diversion system of claim 3, further characterized in that the water-pressured means includes a plurality of rotary spray arms having water-directing spray nozzles directed at the downstream sides of the screens.

6. The fish diversion system of claim 1, further characterized in that supporting structure is founded for supporting the screens, said structure including a plurality of vertical channel means spaced apart lengthwise of the watercourse and having upwardly opening upper ends to receive the screens in vertical slide-in, slide-out fashion.

7. The fish diversion system of claim 6, in which each channel means includes a double channel affecting selective lateral positioning of the screens.

* * * * *